(12) United States Patent
Schreiter

(10) Patent No.: US 6,206,434 B1
(45) Date of Patent: Mar. 27, 2001

(54) CLAMPABLE PIPE COUPLING

(75) Inventor: Reiner Schreiter, Maintal (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 09/237,178

(22) Filed: Jan. 25, 1999

(30) Foreign Application Priority Data

Jan. 24, 1998 (DE) .............................................. 198 02 676

(51) Int. Cl.$^7$ .................................................... F16L 17/00
(52) U.S. Cl. .......................... 285/104; 285/112; 285/340; 285/382; 285/906
(58) Field of Search .................................. 285/104, 105, 285/340, 382–7, 112, 328, 906

(56) References Cited

U.S. PATENT DOCUMENTS

| | | | | |
|---|---|---|---|---|
| 3,632,141 | * | 1/1972 | Larsson ............................... | 285/382.7 |
| 3,746,376 | * | 7/1973 | Gold ................................... | 285/382.7 |
| 4,635,975 | * | 1/1987 | Campbell ............................ | 285/340 |
| 4,676,531 | * | 6/1987 | Martin ................................ | 285/382.7 |

FOREIGN PATENT DOCUMENTS

| | | |
|---|---|---|
| 25 55 179 B2 | 12/1975 | (DE) . |
| 27 31 465 C2 | 7/1977 | (DE) . |
| 2834046A | 2/1980 | (DE) . |
| 41 11 952 C1 | 4/1991 | (DE) . |
| 42 04 762 C1 | 2/1992 | (DE) . |
| 44 11 062 C1 | 3/1994 | (DE) . |
| 0060309A | 9/1982 | (EP) . |
| 0205896A | 12/1986 | (EP) . |
| 0211158 A1 | 2/1987 | (EP) . |
| 0360946A | 4/1990 | (EP) . |
| 0 769 646 A1 | 10/1995 | (EP) . |
| 0 769 647 A1 | 10/1995 | (EP) . |
| 2662489 | 11/1991 | (FR) . |
| 1582859 | 1/1981 | (GB) . |
| 2287998 | 10/1995 | (GB) . |
| 63-152789 | 6/1988 | (JP) . |
| 1-177405 | 7/1989 | (JP) . |

* cited by examiner

*Primary Examiner*—Dave W. Arola
(74) *Attorney, Agent, or Firm*—Darby & Darby

(57) ABSTRACT

A pipe coupling axially connects two pipes having a smooth outer surface. The pipe coupling includes a first split circular ring and a second split circular ring. The first and the second split circular rings are made from a metal strip. Each of the strips have a radially inner edge surrounding the ends of the pipes. A plurality of teeth are disposed at the radially inner edge of the strips. The teeth are disposed in the plane of the respective rings. A free end of the tooth penetrates into the pipe when the coupling is in the clamped position. The teeth extend at an angle relative to a longitudinal axis of the pipes. A side of each of the teeth facing toward the pipe inserted in the coupling have, adjacent to the free end of the tooth, at least one indentation. The indentation displaces the material of the tooth on the side of the tooth in the direction toward the free end of the tooth.

3 Claims, 5 Drawing Sheets

CLAMPABLE PIPE COUPLING

BACKGROUND OF THE INVENTION

1. Field of the Invention

The present invention relates to a clampable pipe coupling to axially connect two pipes having a smooth outer surface. The coupling includes split annular or ring-shaped elements that are made from a metal strip. The rings have edge that, in the clamped position, surrounds the pipe ends. The radially inner radial edge of the rings have teeth that extend in the plane of the ring. The free ends of the teeth penetrate into the pipe material when the pipe coupling is in the clamped position. The teeth penetrate into one pipe and extend at an angle relative to the longitudinal axis of the pipe. The teeth also extend at an angle relative to the teeth that engage in the other pipe.

2. Discussion of the Related Arts

Conventional pipe couplings such as, for example, those described in German Reference No. DE 25 55 179B2, have teeth (which are also referred to as "claws") that are configured like pointed sawteeth. Circumferentially neighboring edges of the sawteeth are V-shaped. A radially inner front face of the sawteeth are inclined relative to the longitudinal axis of the pipes that are joined by the coupling. The pointed tips of these teeth penetrate deeply into the pipe material, even metal pipes, thereby preventing the pipe ends from slipping out of the coupling when the pipes are subject to a high internal pressure. If the teeth are made of a sufficiently rigid material, with increasing internal pressure, the pipes will try to separate, which causes the teeth to move from their radially inclined position relative to the longitudinal axis toward a position where the teeth are normal to the longitudinal axis. In other words, the teeth tend to stand up radially as the pipes attempt to move apart due to internal pressure. As the teeth stand up, their grip and depth of penetration into the pipe around the perimeter of the pipe intensifies, thereby ensuring the axial integrity of the pipe connection in spite of rising internal pressure. But in the case of very high internal pressures, the teeth bend because they are not strong enough. The bending of the teeth is mostly due to their tapered, pointed ends.

Additionally, these conventional sawteeth have radially inner, front surfaces that are inclined rather than perpendicular to the plane of the strip. Thus, producing these sawteeth from a flat metal strip is a complex operation. Similar difficulties are encountered with earlier tooth configurations of pipe couplings, such as those described in German Reference Nos. 27 31 464, 41 11 952, 42 04 762 and 44 11 062, as well as in European Patent Application Nos. 95116480.5 and 95116481.3.

SUMMARY OF THE INVENTION

It is an object of the present invention to provide a pipe coupling that has teeth which have greater strength and flexural stiffness, and is easier to produce.

According to an exemplary embodiment of a pipe coupling according to the present invention, this and other objects are achieved with a split circular ring, which has a radially inner edge surrounding the end of the pipe to be clamped. Teeth are disposed at the radially inner edge of the split circular ring. A side of each tooth faces the outside surface of the pipe inserted in this side of the coupling. This side of the tooth has, in the area near or adjacent to the free end of the tooth, at least one indentation. The indentation is stamped into the side of the tooth that faces the adjacent pipe. The indentation causes the material on this side of the tooth to be displaced toward the free end of the tooth.

The displacement of the tooth material in the indentation process causes the teeth to acquire a sharper point, thereby allowing them to penetrate deeper into the pipe material. In addition, it is possible, in a simple manner during the process of punching or die cutting the metal strip, to cut the teeth perpendicular to the plane of the metal strip and to simultaneously stamp the indentations using an appropriate die stamp. In their respective locations, the indentations cause the material of the teeth to become denser and, thus, stronger. An added measure of rigidity is thereby provided by the edge along the indentations resulting in greater flexural stiffness of the serration near the free ends of the teeth.

The indentations preferably have the shape of a section of a hollow sphere, which provides the teeth with very high stiffness and ensures a particularly effective displacement of the tooth material toward the free end of each tooth.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawing, wherein.

Figure 1:
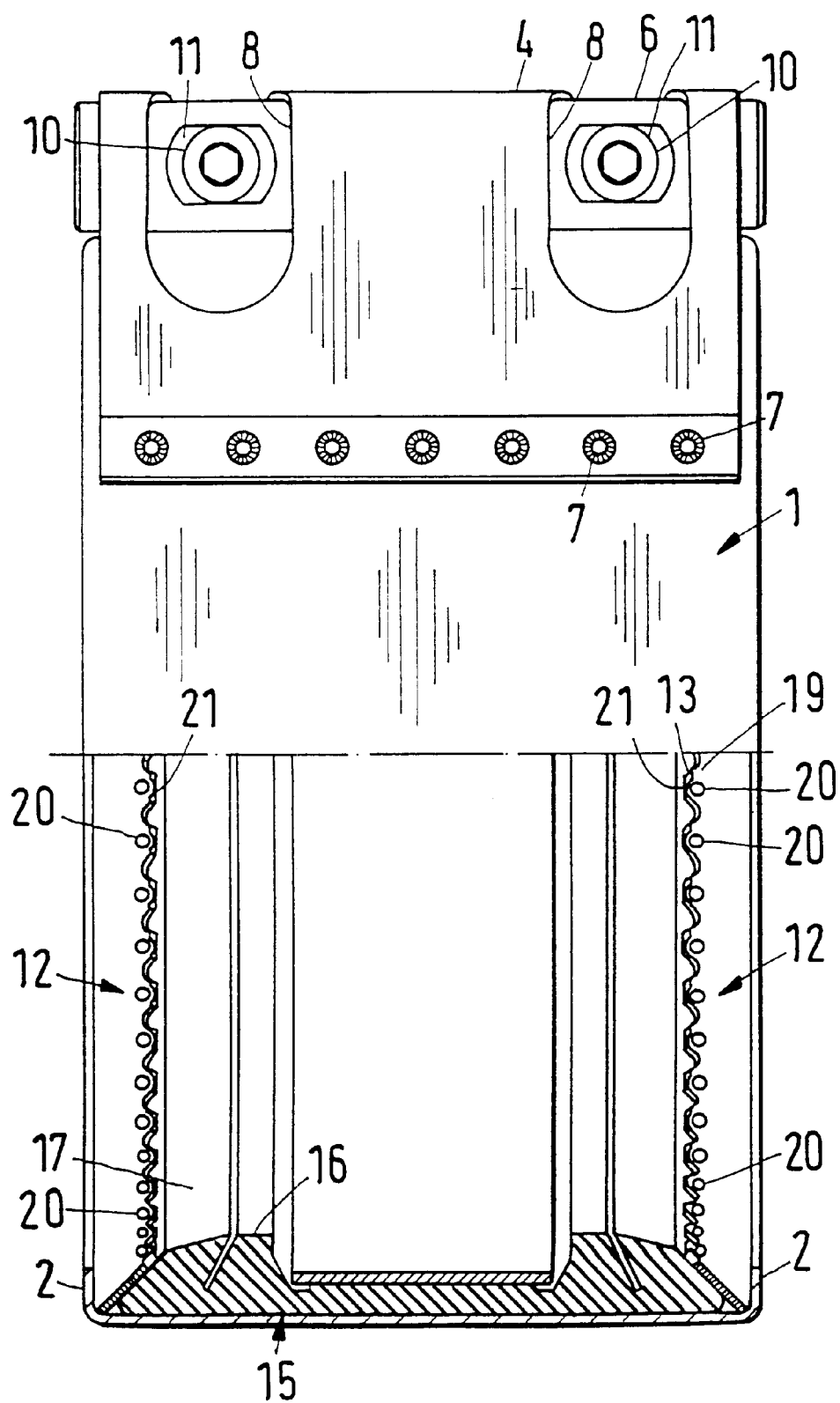
FIG. 1 is a front view, in partial cross section, of the pipe coupling according to the present invention.
Figure 3:
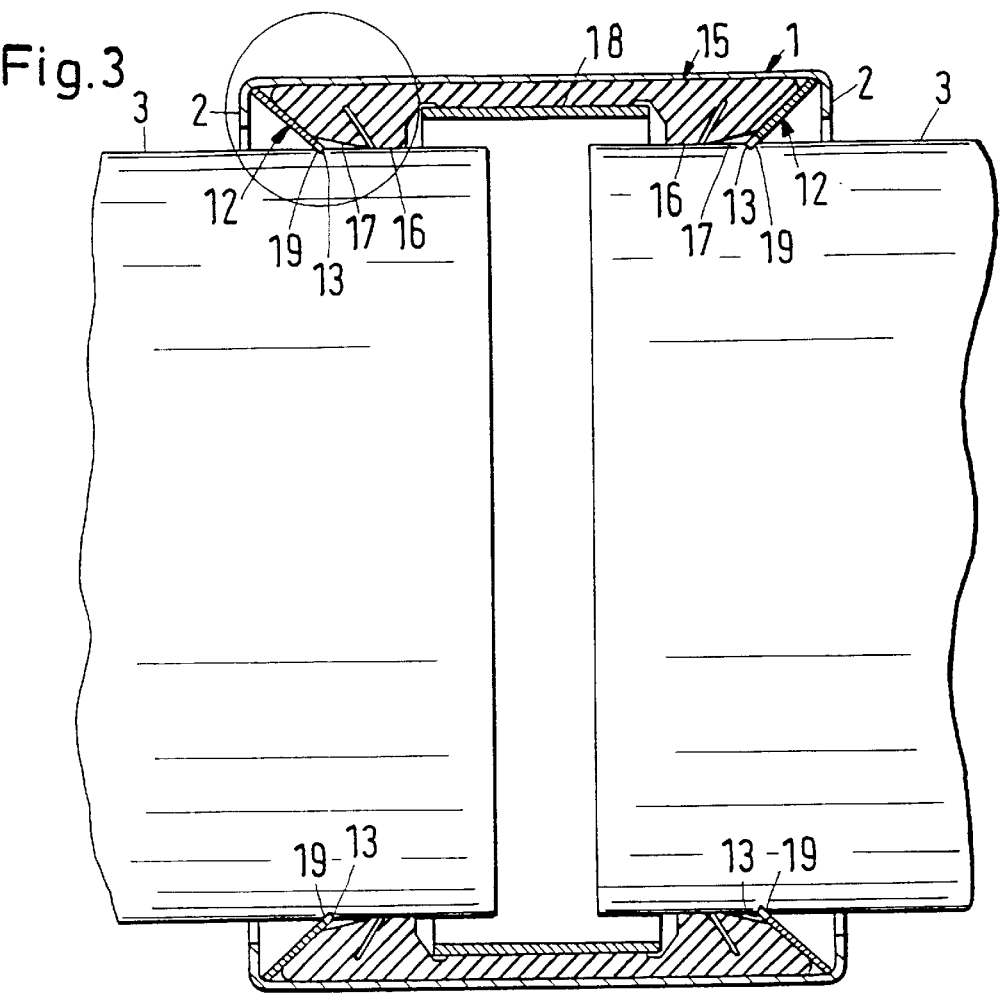
FIG. 3 is an axial sectional view of the pipe coupling of FIG. 1 shown in the clamped position, axially connecting two smooth surfaced pipes.
Figure 4:
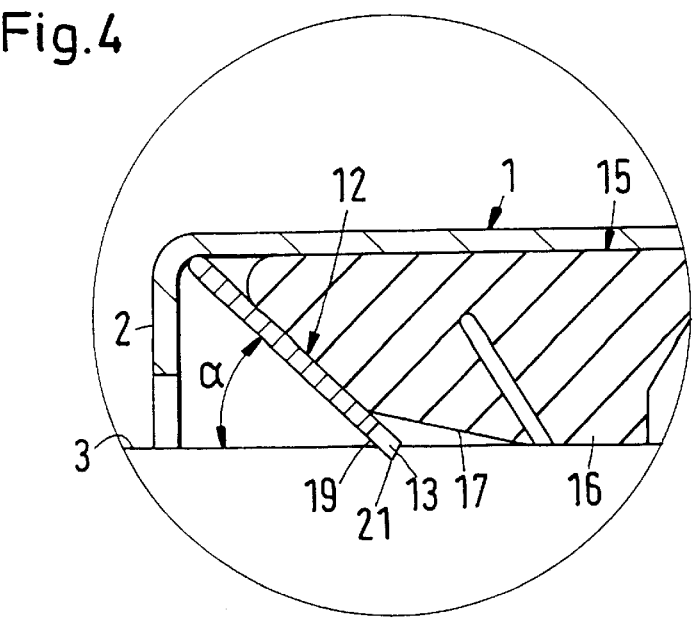
FIG. 4 is an enlarged detail of FIG. 3.
Figure 5:
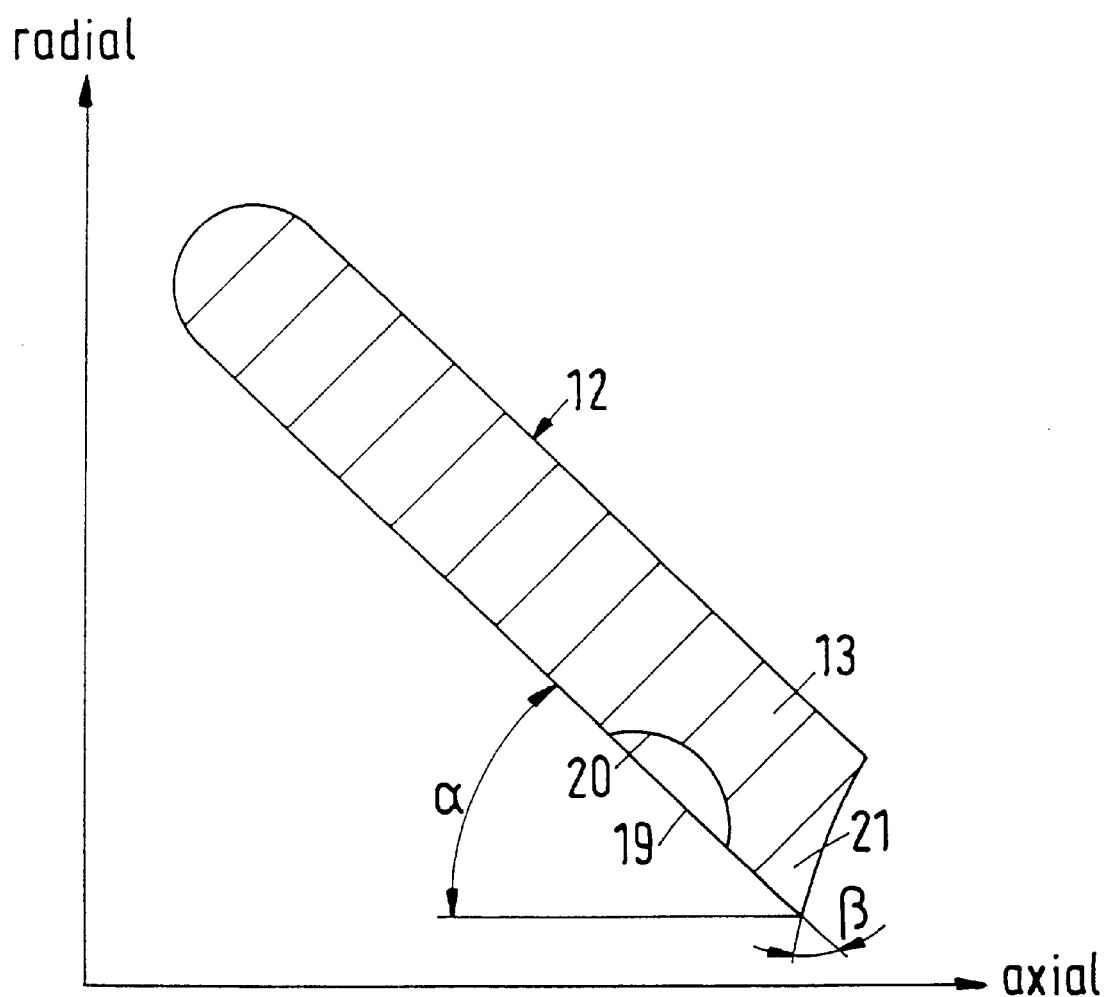

FIG. 5 a cross sectional view, in the proximity of a tooth, of the ring illustrated on the left in FIGS. 1, 3 and 4.

Figure 2:
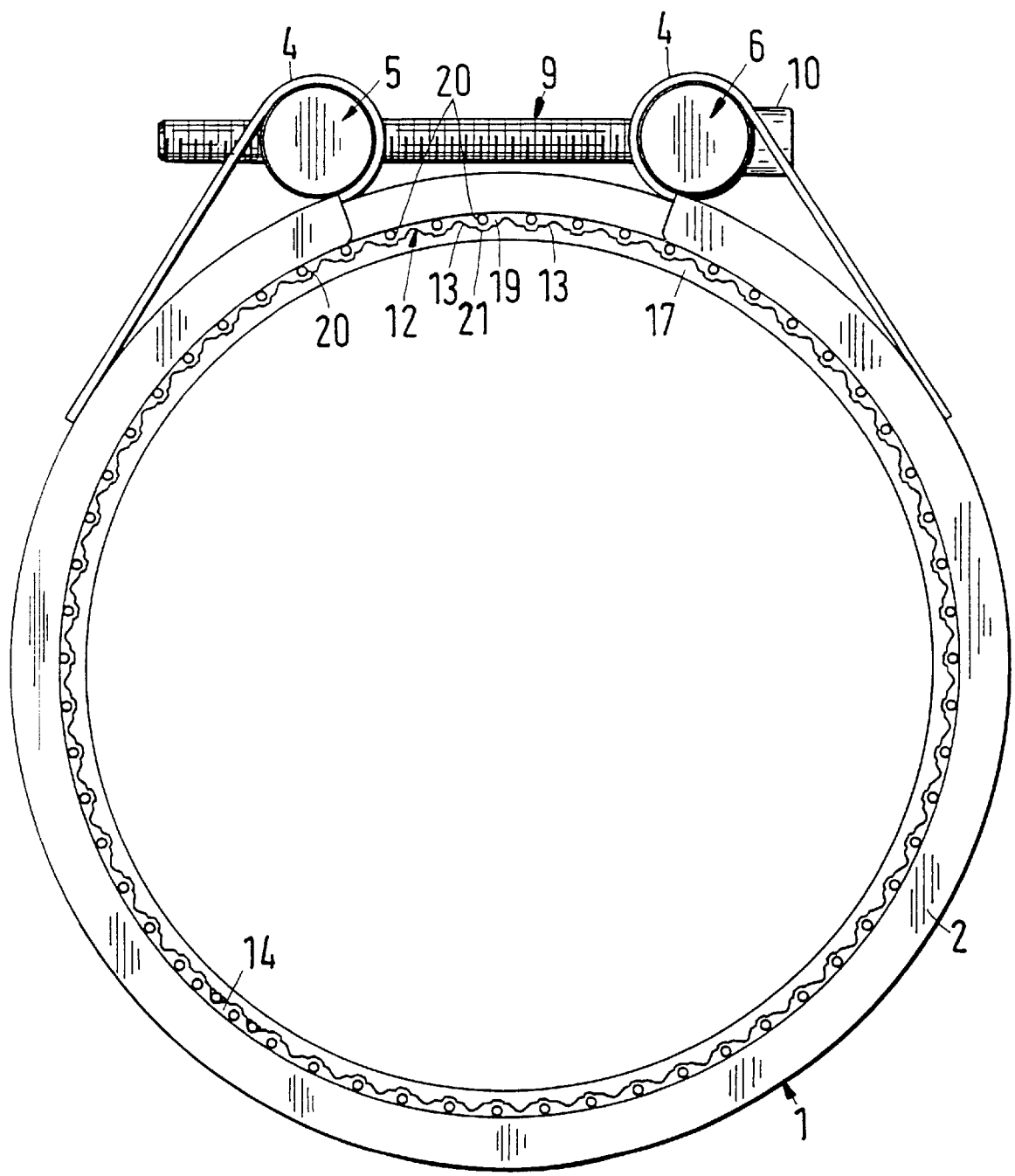
FIG. 2 is an axial side view of the pipe coupling of FIG. 1.
Figure 6:
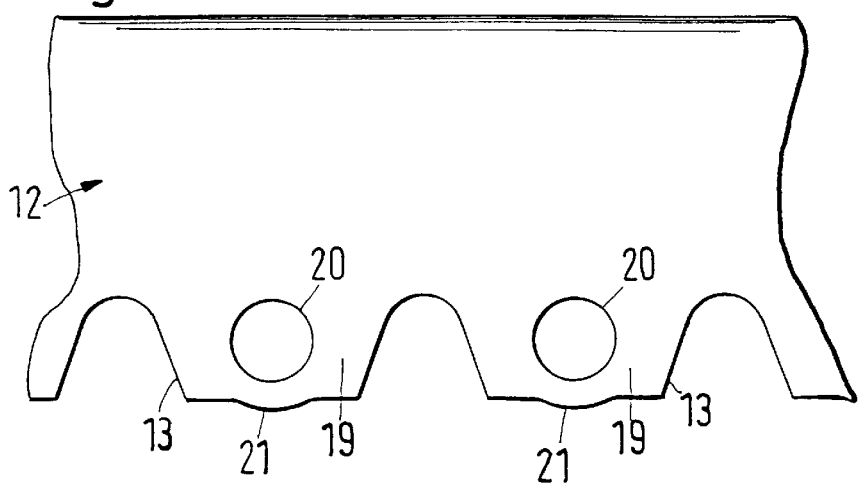
Figure 7:
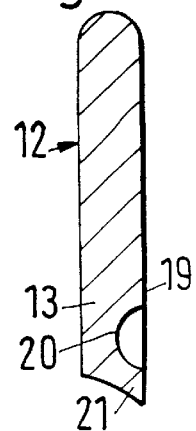
Figure 8:
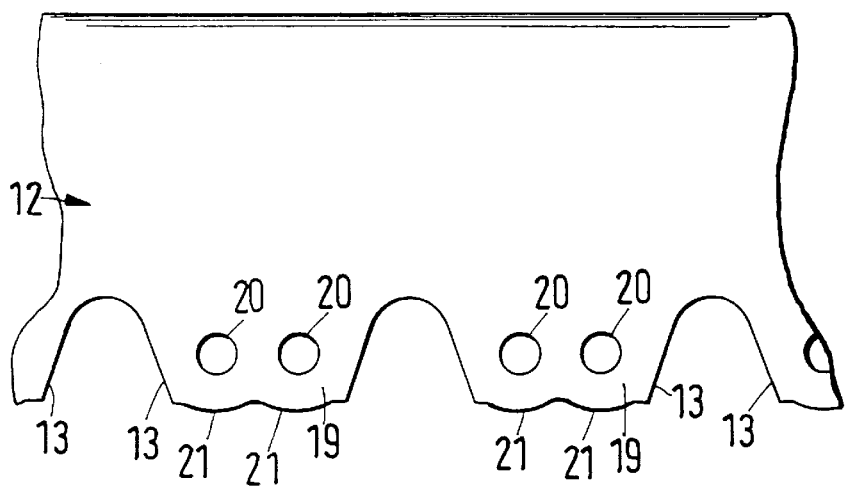
Figure 9:
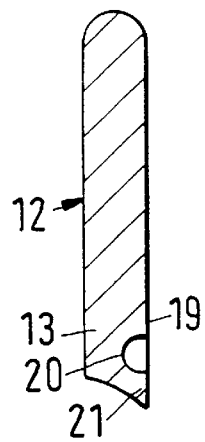
Figure 10:
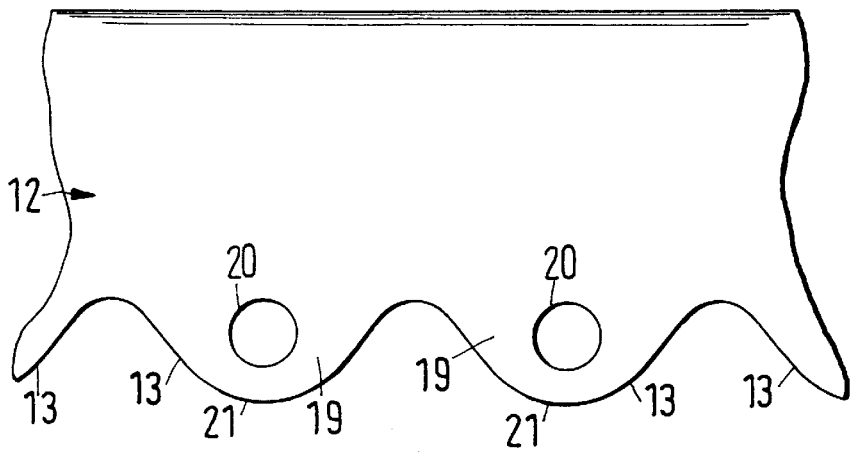
Figure 11:
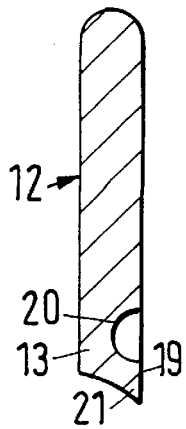

FIG. 6 is an enlarged detail, in an axial perspective, of a ring of the pipe coupling of FIGS. 1–3;

FIG. 7 is a sectional view, in the area of an indentation, of the ring of FIG. 6;

FIG. 8 is an enlarged detail, similar to FIG. 6, of a modified ring suitable for use in the pipe coupling of FIGS. 1–3, with each tooth having two indentations instead of one;

FIG. 9 is a sectional view, in the area of an indentation, of the ring of FIG. 8;

FIG. 10 is an enlarged detail, similar to FIG. 6, of another modified version of the ring suitable for use in the pipe coupling of FIGS. 1–3, in which the serrations are precorrugated; and FIG. 11 is a sectional view, in the area of an indentation, of the ring of FIG. 10.

DETAILED DESCRIPTION OF A PREFERRED EMBODIMENT

Referring now to FIGS. 1–7, a pipe coupling according to the present invention is illustrated. The pipe coupling includes an outer sheet steel casing 1 that is bent into less than a complete ring (see FIG. 2). Radially bent in front faces 2 are provided at each axial end of casing 1. The inner diameter of each front face 2 is larger than the outer diameter of the pipes 3 to be connected by the pipe coupling (see FIG. 3). Casing 1 is split or open in the circumferential direction, thereby forming the incomplete ring. The free ends of casing 1 are bent radially outwardly and back, thereby forming a loop 4 at each free circumfrential end of the incomplete ring (see FIGS. 1 and 2). The free ends of casing 1 are attached, via buckle weldments 7, to the outer surface of casing 1 (see FIG. 1). A bolt 5 is inserted in each loop 4. Each loop 4 has a slot 8 that extends around a major portion of each bolt 5, 6 (see FIG. 1). Each bolt 5, 6 has a through bore that is located in an area corresponding to the location of slot 8 in the assembled position. The through bore in bolt 6 is threadless, whereas the through bore in bolt 5 is threaded. A headed clamping screw 9 extends through each slot 8 and the through bore in bolts 5, 6. A threaded shaft of clamping screw 9 mates with the internally threaded through bore in bolt 5. Each clamping screw 9 has a socket head 10 with a shoulder 11 that abuts against a flared pocket at the end of the through bore in bolt 6 that faces head 10 in the clamped position.

A radially outer edge of a frustum-shaped, circumferentially discontinuous ring 12 abuts against the inner surface of each radially bent in front face 2 of casing 1. The free ends 14 of each ring 12 overlap in the circumferential direction (see FIG. 2). Rings 12 are shaped from a metal strip. Teeth 13 are disposed at the radially inner edge of rings 12. Teeth 13 are disposed in the plane of the metal strip forming rings 12.

An elastomer gasket 15 is disposed radially inside of casing 1 (see FIGS. 3 and 4). The axial ends of gaskets 15 form lip seals 16 and 17 that protrude radially inwardly. In the clamped position, lip seals 16, 17 press against the outside of pipes 3. A sheet-metal ring 18 is located between lip seals 16. Ring 18 is disposed radially inside of a middle portion of gasket 15. Ring 18 is a split ring in the circumferential direction and has free end sections that overlap each other in the circumferential direction. Ring 18 ensures, in the clamped position, that the material of elastomer gasket 15 will not squeeze between the ends of the pipes 3. The gap between the two ends of the circular casing 1 is spanned by a bridge which abuts against the outer circumference of gasket 15 and is overlapped by the end sections of the casing 1.

As illustrated in FIGS. 3–5, ring 12, including its teeth 13, are inclined relative to the pipe by an angle αbetween about 35° and about 55°, preferably about 45°. An indentation 20 is stamped in the ring near the free end of the tooth 13 on the side 19 of each tooth 13 that faces toward the pipe 3 that is inserted in the side of the pipe coupling having this ring 12 (see FIGS. 5–7). Indentation 20 causes the material of the tooth 13 on side 19 to be displaced toward the free end of the tooth (see FIG. 5). Indentation 20 produces a sharp-edged tip 21 at the free end of each tooth 13. Tip 21 has a wedge angle βof between about 50° and 80°, preferably about 70°.

The surface of each indentation 20 is preferably shaped like a section of a hollow sphere. But indentation 20 may also be shaped, for example, like a pointed or truncated cone, trihedron or tetrahedron.

When the coupling is in the clamped position, teeth 13 with their tips 21 disposed at their free ends, penetrate into the pipe material as shown in FIGS. 3 and 4. Thus, teeth 13 prevent pipes 3 from pulling apart when there is high internal pressure in the pipes 3. Moreover, rings 12 along with teeth 13 have a tendency to stand up radially as the pipes 3 attempt to move apart due to the internal pressure. Thus, as a result of increasing internal pressure, teeth 13 will penetrate even more deeply into the pipe material, thereby increasing the axial load capacity of the pipe connection provided by the coupling as the internal pressure increases.

Rings 12 are produced by first punching out a flat metal sheet perpendicular to the plane of the metal sheet by a die-cutting operation. Simultaneously, the teeth are die cut from the metal sheet. Additionally, indentations 20 are simultaneously die stamped into the outside 19 of teeth 13. Thus, in one single die cutting and stamping operation, the tooth material is displaced toward the free end of the teeth 13, while the front face of the teeth 13, which initially extends perpendicular to the plane of the teeth, is formed into a tip 21 at a wedge angle of β. At the same time, the stamping of indentations 20 causes the tooth material in the area of the indentations 20 to increase in density and, thus, in strength, thereby giving teeth 13 greater flexural stiffness. That strength is further augmented by the edge along the perimeter of indentations 20. The pipe connection is, thus, capable of withstanding very high axial loads without bending teeth 13, which loads would otherwise push the pipes apart if it were clamped with a conventional pipe coupling.

FIGS. 8 and 9 illustrate a modified configuration of teeth 13 in which the outside 19 of each tooth 13 is provided with two circumferentially juxtapositioned indentations 20. In the embodiments of FIGS. 1–9, teeth 13, apart from the indentations 20 at their radial inner end, extend linearly up to where the ends of the rings 12 are bent into truncated cones. Indentations 20, however, create tips 21 that protrude in the radial inward direction, approximately in a circular arc. In contrast, in the modified embodiment illustrated in FIGS. 10 and 11, teeth 13 are already cut into a sinusoidal wave-like or corrugated form. Thus, the stamping of indentations 20 has no significant effect on the largely continuous corrugation that forms teeth 13, as shown in the axial sectional view of FIG. 10.

To clamp metal pipes, ring 1 is preferably made of hardened sheet metal, such as, for example, steel. For pipes made of a softer material, such as, for example, plastic, ring 1 is preferably made of a softer sheet metal.

Having described the presently preferred exemplary embodiment of a fuel or fuel vapor fluid conduit in accordance with the present invention, it is believed that other modifications, variations and changes will be suggested to those skilled in the art in view of the teachings set forth herein. For example, the front faces 2 may not extend precisely radially, but may be bent in an axial relation with respect to one another. Rings 12 are preferably provided with teeth 13 that are configured to bite into the pipe material. Additional rings 12 may also be used. In certain instances, rings 12 may not be needed, with the front faces 2 alone constituting appropriate rings. Alternatively, the inside of casing 1 may be equipped with a dual row of serrated rings, with the teeth of each ring angled either in the same direction or in opposite directions relative to the longitudinal axis. It is, therefore, to be understood that all such modifications, variations, and changes are believed to fall within the scope of the present invention as defined by the appended claims.

What is claimed is:

1. A pipe coupling for axially connecting two pipes having a smooth outer surface, said pipe coupling comprising:

a casing;

a first split circular ring connected to said casing; and a second split circular ring connected to said casing, wherein said first and said second split circular rings are made from a metal strip, each of said strips having a radially inner edge, said first strip surrounding the end of one of the two pipes and said second strip surrounding the end of the other of the two pipes in the clamped position, a plurality of teeth being disposed at said radially inner edge of said strips, said teeth being disposed in the plane of the said respective rings, a free end, of each of said teeth penetrating into the respective pipe when the coupling is in the clamped position, said teeth extending at an angle relative to a longitudinal axis of the two pipes, a side of each of said teeth facing toward the respective pipe inserted in the coupling having, adjacent to the free end of said tooth, at least one indentation, said indentation displacing the material of said tooth on said side of said tooth in the direction toward said free end of said tooth.

2. The pipe coupling according to claim 1, wherein said indentation has a partial hollow sphere shape.

3. The pipe coupling according to claim 1, wherein said indentation is stamped into said side of said tooth.

\* \* \* \* \*